United States Patent
Adachi et al.

(10) Patent No.: US 7,440,202 B2
(45) Date of Patent: Oct. 21, 2008

(54) LENS DRIVE APPARATUS

(75) Inventors: Yoshiki Adachi, Okazaki (JP); Hiroshi Ezawa, Yokohama (JP)

(73) Assignee: Denso Corporation, Kariya (JP)

( * ) Notice: Subject to any disclaimer, the term of this patent is extended or adjusted under 35 U.S.C. 154(b) by 69 days.

(21) Appl. No.: 11/502,496

(22) Filed: Aug. 10, 2006

(65) Prior Publication Data

US 2007/0035860 A1    Feb. 15, 2007

(30) Foreign Application Priority Data

Aug. 10, 2005   (JP)   ............................. 2005-232277

(51) Int. Cl.
*G02B 7/02*   (2006.01)
*G11B 7/00*   (2006.01)
(52) U.S. Cl. ...................... 359/824; 359/814; 369/44.15
(58) Field of Classification Search ................. 359/824, 359/823, 813, 819, 814; 369/44.15, 44.16, 369/44.17, 44.32, 44.28
See application file for complete search history.

(56) References Cited

U.S. PATENT DOCUMENTS

| | | | |
|---|---|---|---|
| 5,128,806 A * | 7/1992 | Ohno ......................... | 359/813 |
| 5,191,484 A * | 3/1993 | Yeon et al. ................... | 359/824 |
| 5,212,673 A * | 5/1993 | Honda ...................... | 369/44.15 |
| 5,303,089 A | 4/1994 | Ohno et al. ................. | 359/824 |

FOREIGN PATENT DOCUMENTS

| | | |
|---|---|---|
| JP | 10-096624 | 4/1998 |
| JP | 10-123252 | 5/1998 |

OTHER PUBLICATIONS

Office Action dated Oct. 19, 2007 in Chinese Application No. 2006 1011 4856.7 with English translation.

* cited by examiner

*Primary Examiner*—Mohammed Hasan
(74) *Attorney, Agent, or Firm*—Harness, Dickey & Pierce, PLC

(57) ABSTRACT

Shafts are fixed to a base and extend in a direction parallel to a center axis of a through hole of the base. Two yoke arrangements are installed to the shafts. A lens holder frame holds a lens, which has an optical axis parallel to the central axis of the through hole of the base. The lens holder frame is axially placed in a space between the two yoke arrangements and is swingably supported by a plurality of wire springs, which are fixed to the base. Drive coils are fixed to the lens holder frame and generate a drive force to move the lens holder frame.

9 Claims, 11 Drawing Sheets

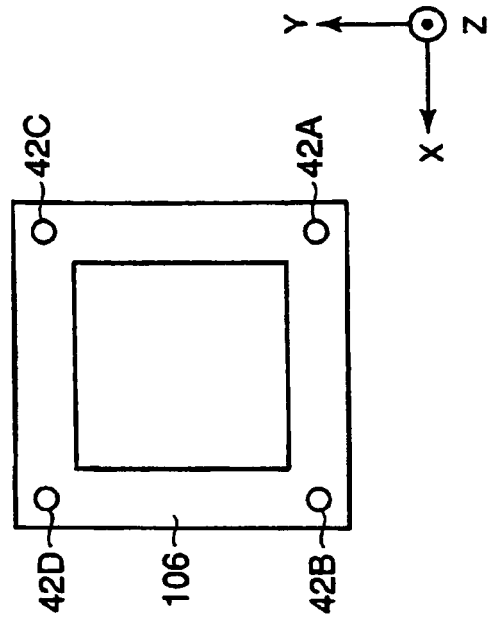
FIG. 11
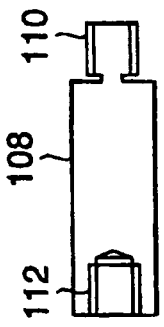
FIG. 12A
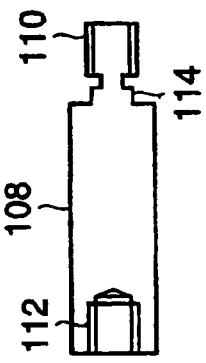
FIG. 12B
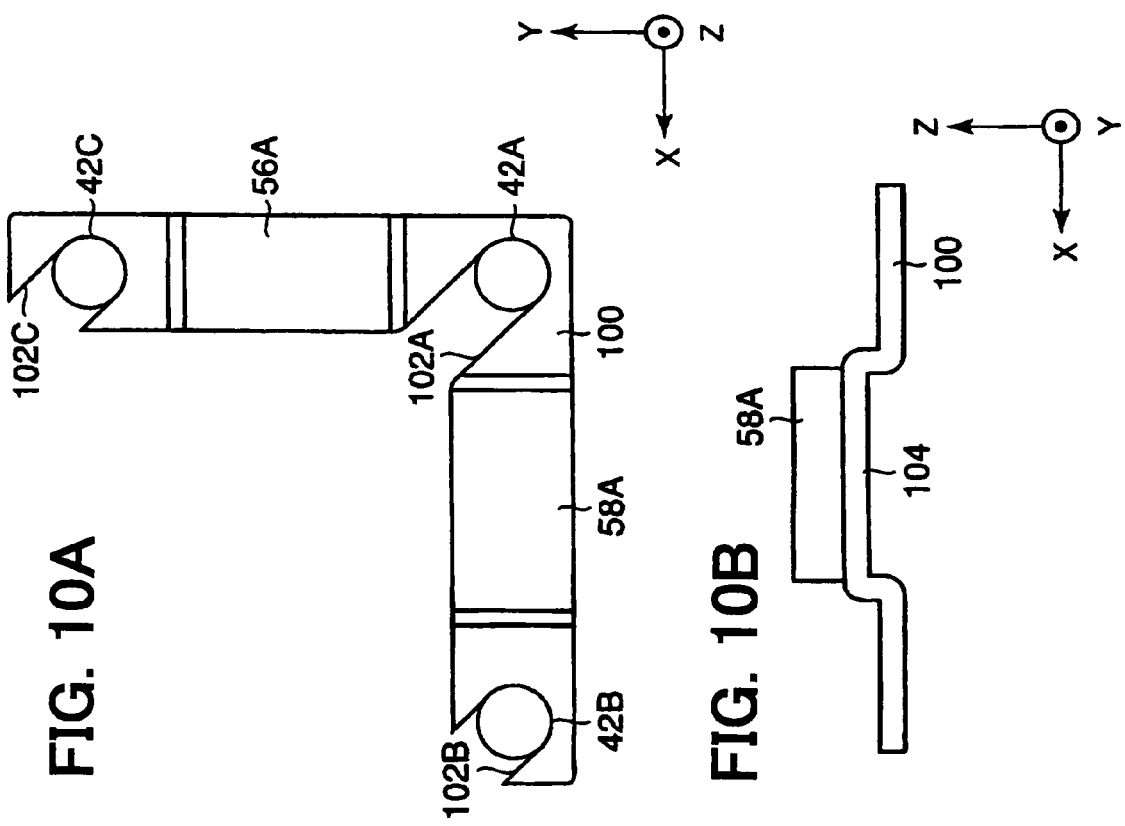
FIG. 10A
FIG. 10B

LENS DRIVE APPARATUS

CROSS REFERENCE TO RELATED APPLICATION

This application is based on and incorporates herein by reference Japanese Patent Application No. 2005-232277 filed on Aug. 10, 2005.

BACKGROUND OF THE INVENTION

1. Field of the Invention

The present invention relates to a lens drive apparatus, which drives a lens.

2. Description of Related Art

A vehicle drive assist system, which includes a onboard video camera to monitor a front side or a rear side of a vehicle, has been marketed. In this system, an image, which is captured by the onboard camera, is displayed on a monitor provided in a passenger compartment of the vehicle. In one previously known system, a stereo camera is used as the above video camera to measure a distance relative an obstacle. In another system, the distance measurement function of the above system is implemented as a scanning laser distance meter. In the scanning laser distance meter, a laser beam is scanned, i.e., swung and is transmitted through a transmission window toward an obstacle. The reflected light, which is reflected from the obstacle, is detected, and the distance to the obstacle is computed based on the detected light.

Japanese Unexamined Patent Publication No. 10-96624 discloses one apparatus that scans the laser beam by swinging a mirror. Instead of swinging the mirror, a lens may be swung or move to scan, i.e., to swing the laser beam. In such a case, the mechanism recited in Japanese Patent No. 3317997 (corresponding to U.S. Pat. No. 5,303,089) or in Japanese Unexamined Patent Publication No. 10-123252 may be used to swing or move the transmitter lens. In the mechanism recited in Japanese Patent No. 3317997, a bobbin, which holds a lens, is supported by leaf springs, thereby enabling the simplified mechanism. In the mechanism recited in Japanese Unexamined Patent Publication No. 10-123252, multiple coil springs are used to support a lens. The coil springs extend in a direction of an optical axis. The lens is driven by an actuator. This mechanism enables wide range scanning at low costs and high reliability.

The apparatus recited in Japanese Patent No. 3317997 is intended to be used in scanning of an optical disc, and the lens is moved in a single direction that is parallel to the optical axis of the lens. However, in the distance meter, which measured the distance by scanning the laser beam, the lens needs to be moved in the plane that is perpendicular to the optical axis. More specifically, the lens needs to be moved in a first direction, which is perpendicular to the optical axis, and in a second direction, which is perpendicular to the first direction. At this time, unlike Japanese Patent No. 3317997, the lens is placed in a plane, along which the leaf springs of the bobbin extend. In the apparatus recited in Japanese Patent No. 3317997, a yoke is made by bending a single metal plate, and another yoke is placed at an opening end of this yoke. When the lens is placed at the opening end of the yoke, there would not be a problem. However, when the lens is placed in the plane, along which the leaf springs of the bobbin extend, it is difficult to place the magnets, the coils and the yokes without causing interferences with the lens and the optical axis, so that these components need to be placed in remaining limited spaces. When the yokes are formed integrally, the assembling is not easy.

Furthermore, the distance meter, which scans the laser beam, is often installed in the vehicle. In the case of the vehicle, durability of the distance meter needs to be higher than that of domestic appliances. However, the metal plate yokes alone cannot provide the sufficient rigidity, thereby resulting in the low durability of the distance meter.

In the apparatus disclosed in Japanese Unexamined Patent Publication No. 10-123252, the assembling of the lens drive mechanism may not be troublesome. However, the support structure, which supports the lens by the coil springs, is not good enough in terms of the durability. Also, in the case where the apparatus is installed in the vehicle, the countermeasures against the vibration are not good enough.

SUMMARY OF THE INVENTION

The present invention addresses the above disadvantages. Thus, it is an objective of the present invention to provide a lens drive apparatus, which achieves an increased durability of the lens drive apparatus and relatively easy assembling of the lens drive apparatus.

To achieve the objective of the present invention, there is provided a lens drive apparatus, which includes a base, a plurality of shafts, two yoke arrangements, a lens holder frame and a plurality of drive coils. The base has a through hole, which penetrates through the base. The shafts are fixed to the base and extend in a direction generally parallel to a center axis of the through hole of the base. Each yoke arrangement holds a plurality of permanent magnets and surrounds the center axis of the through hole of the base. The yoke arrangements are supported by the shafts and are axially spaced from each other. The lens holder frame holds a lens, which has an optical axis generally parallel to the central axis of the through hole of the base. The lens holder frame is axially placed in a space between the two yoke arrangements and is swingably supported by a plurality of wire springs, which are fixed to the base. The drive coils are fixed to the lens holder frame and generate a drive force to move the lens holder frame.

BRIEF DESCRIPTION OF THE DRAWINGS

The invention, together with additional objectives, features and advantages thereof, will be best understood from the following description, the appended claims and the accompanying drawings in which:

FIG. 10A is a schematic plan view indicating a modification of a yoke of the lens drive apparatus;

FIG. 10B is a schematic side view of the modification shown in FIG. 10A;

FIG. 11 is a schematic plan view indicating another modification of the yoke of the lens drive apparatus;

FIGS. 12A to 12B are schematic view indicating modifications of the cylindrical members of the lens drive apparatus.

DETAILED DESCRIPTION OF THE INVENTION

An embodiment of the present invention will be described with reference to the accompanying drawings.

Figure 1:
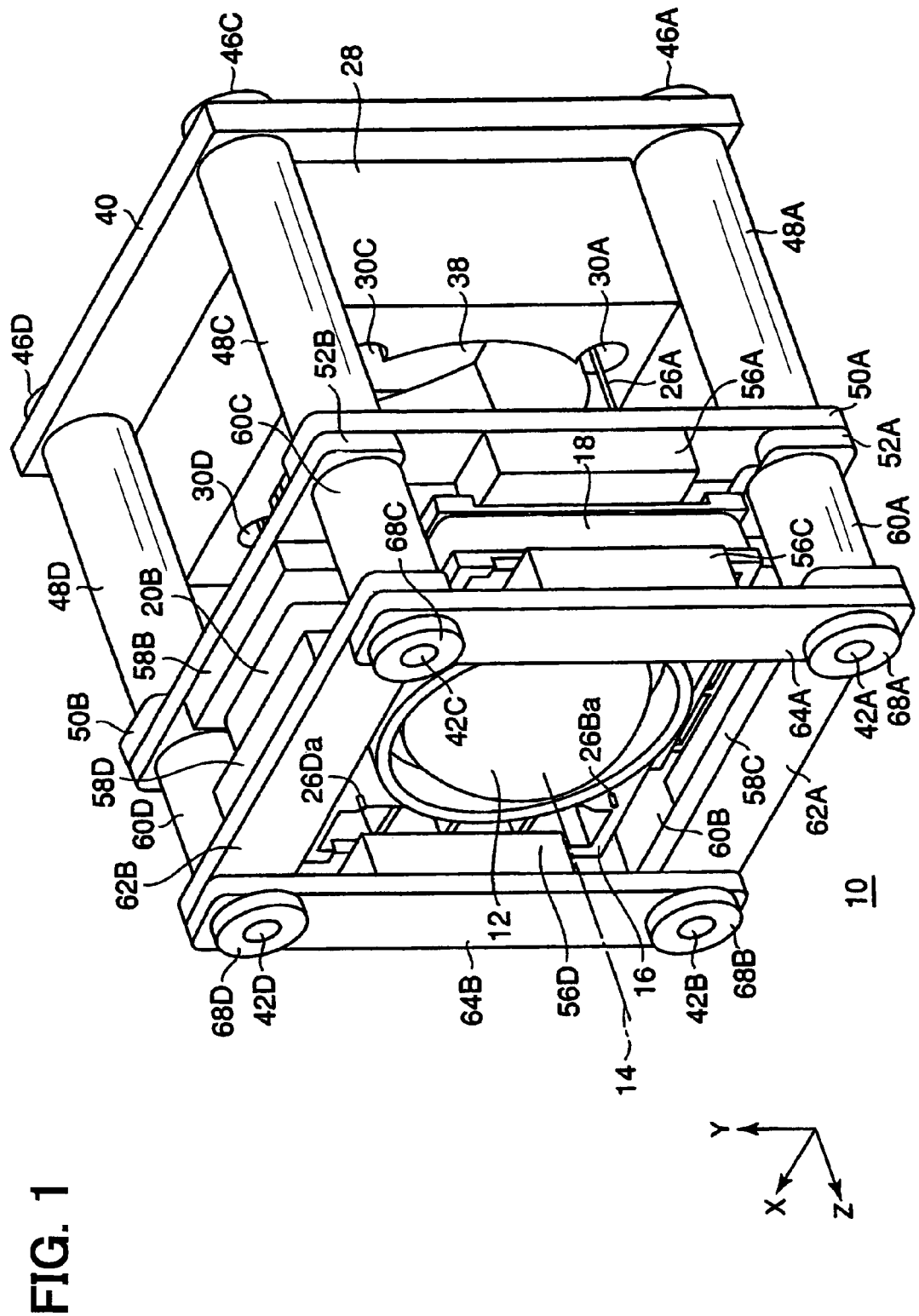
FIG. 1 is a front perspective view of a lens drive apparatus according to an embodiment of the present invention.
Figure 2:
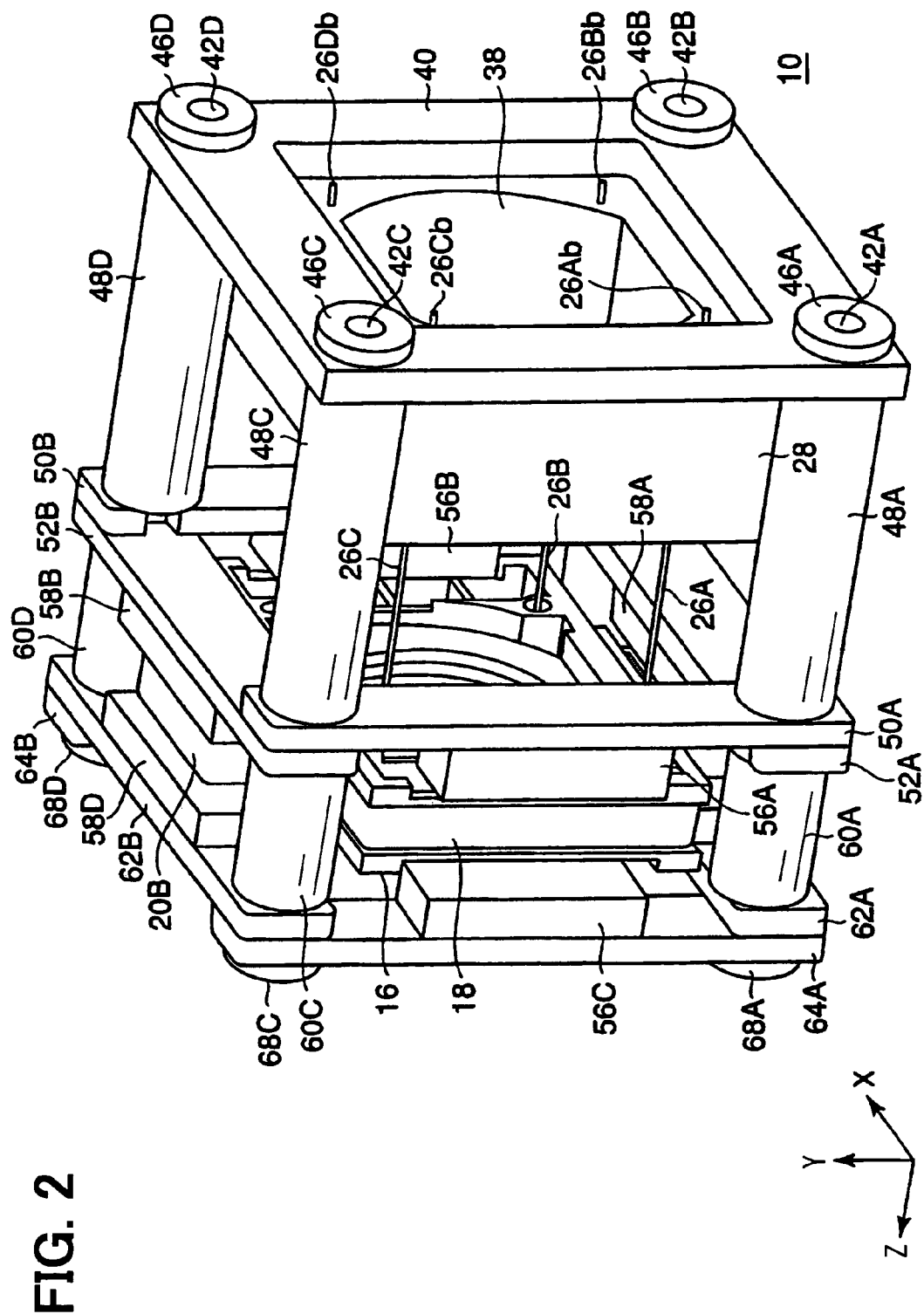
FIG. 2 is a rear perspective view of the lens drive apparatus according to the embodiment.
Figure 3:
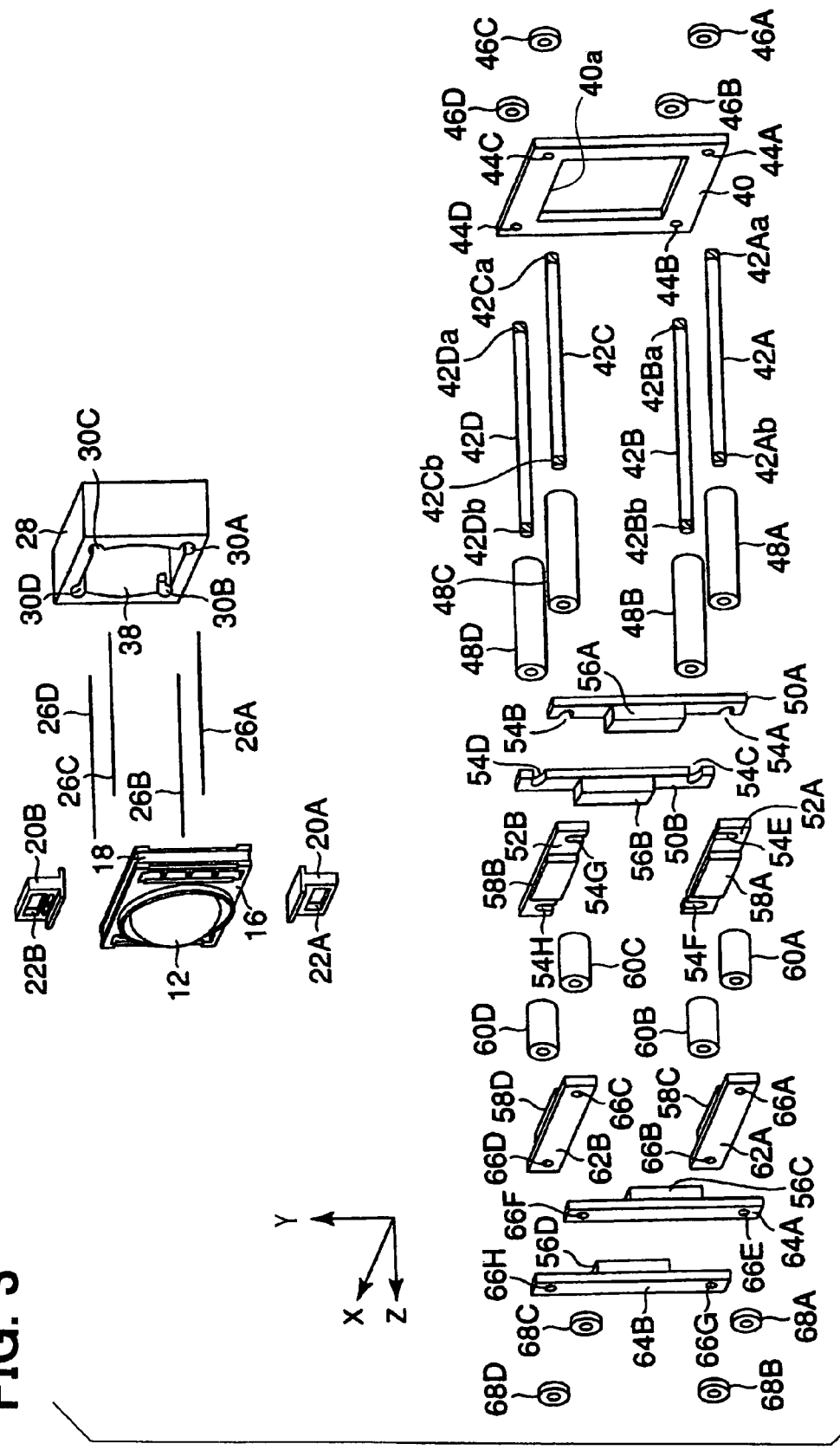
FIG. 3 is a front exploded perspective view of the lens drive apparatus according to the embodiment.
Figure 4:
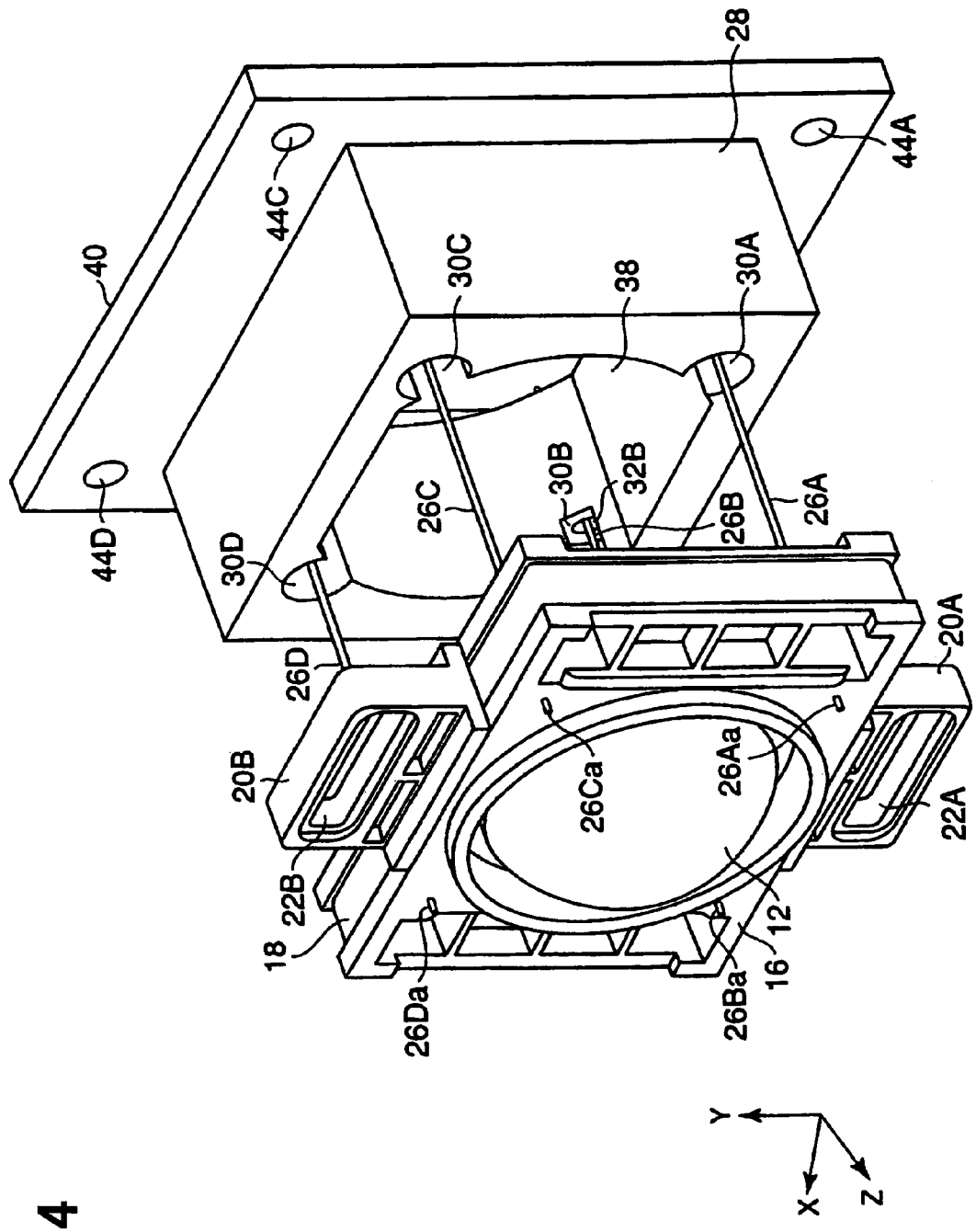
FIG. 4 is a partial front perspective view of the lens drive apparatus according to the embodiment.
Figure 5:
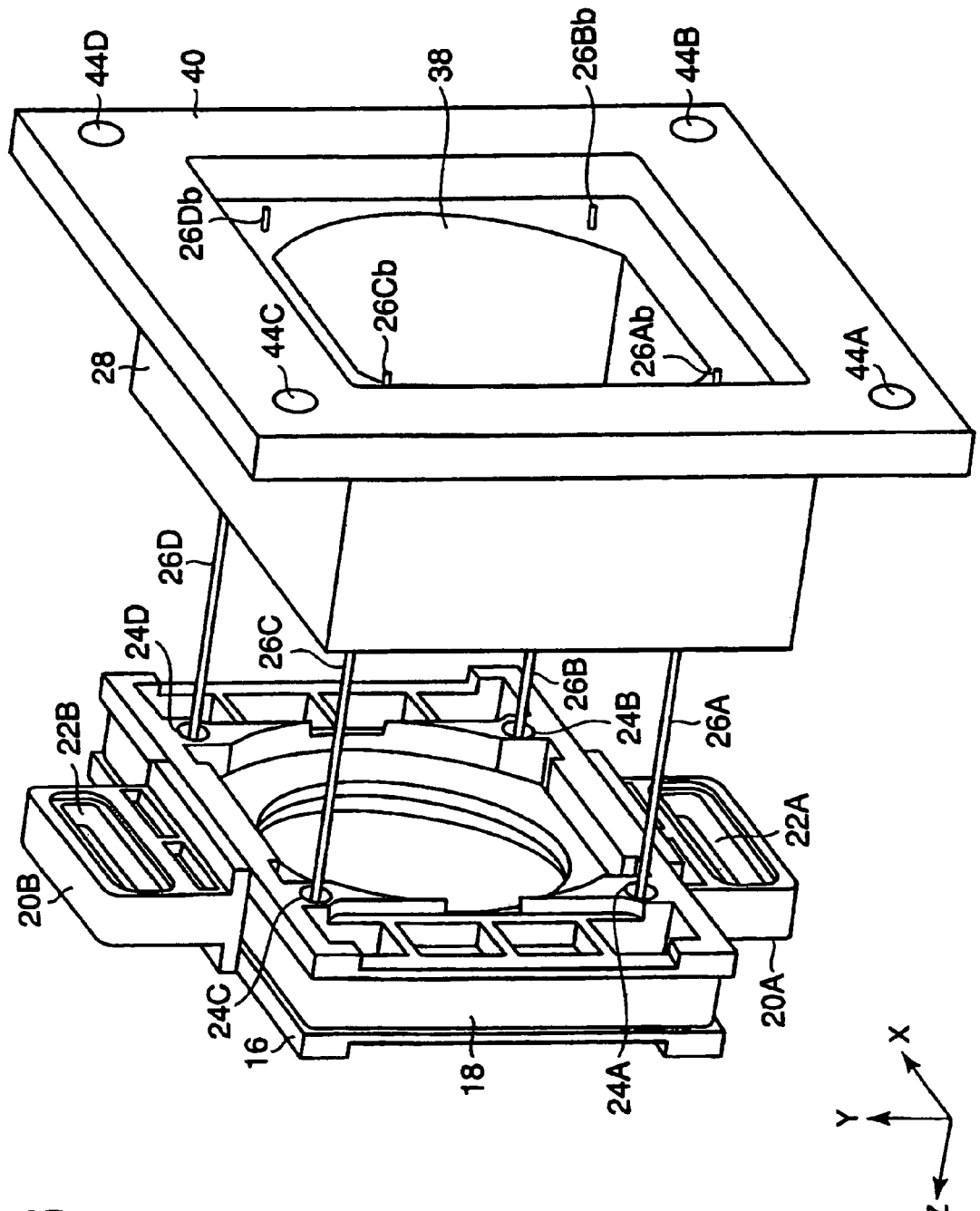
FIG. 5 is a partial rear perspective view of the lens drive apparatus according to the embodiment.
Figure 6:
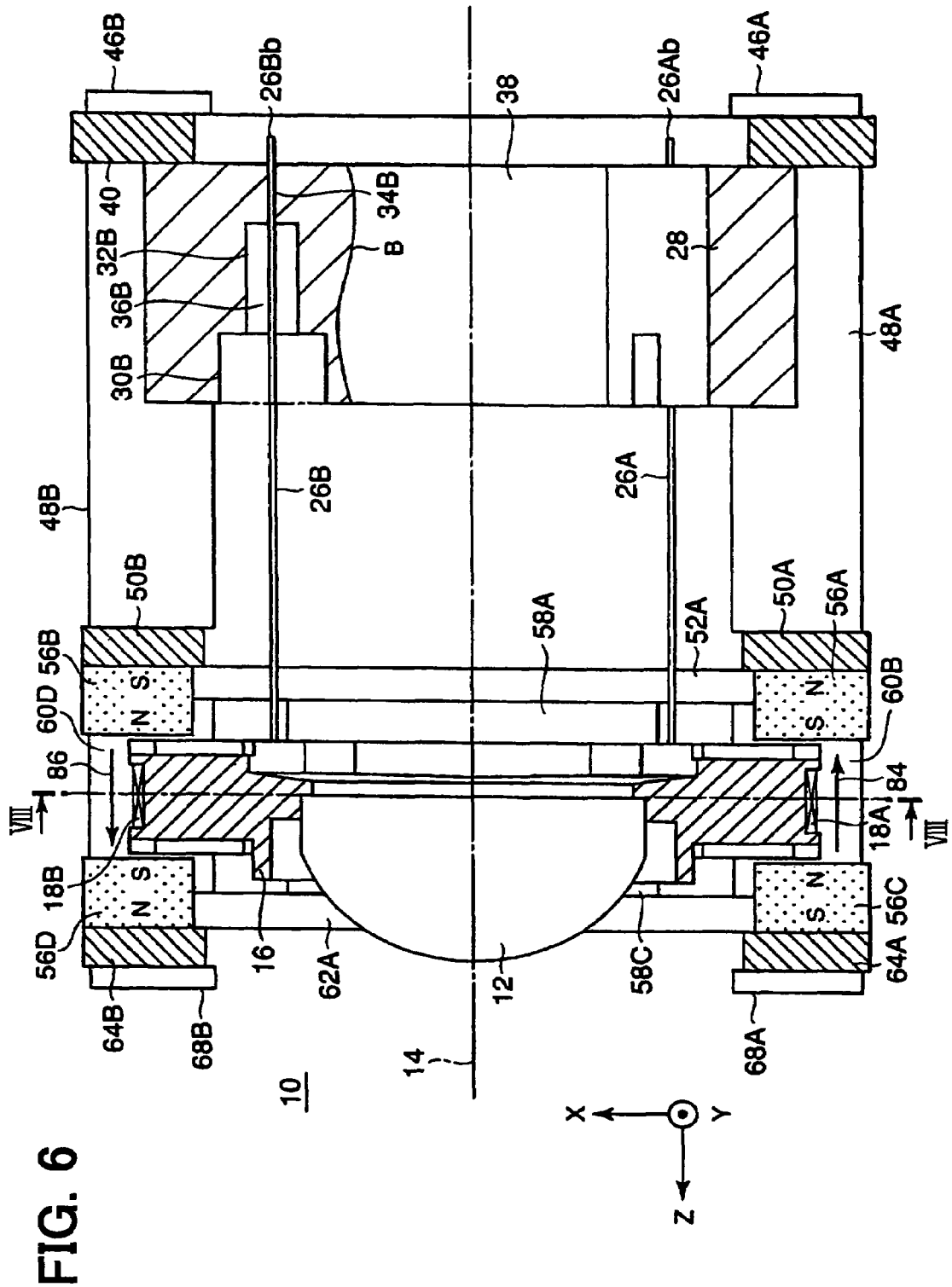
FIG. 6 is a cross sectional view of the lens drive apparatus taken along a Z-X plane, along which an optical axis of a transmitter lens of the lens drive apparatus passes.
Figure 7:
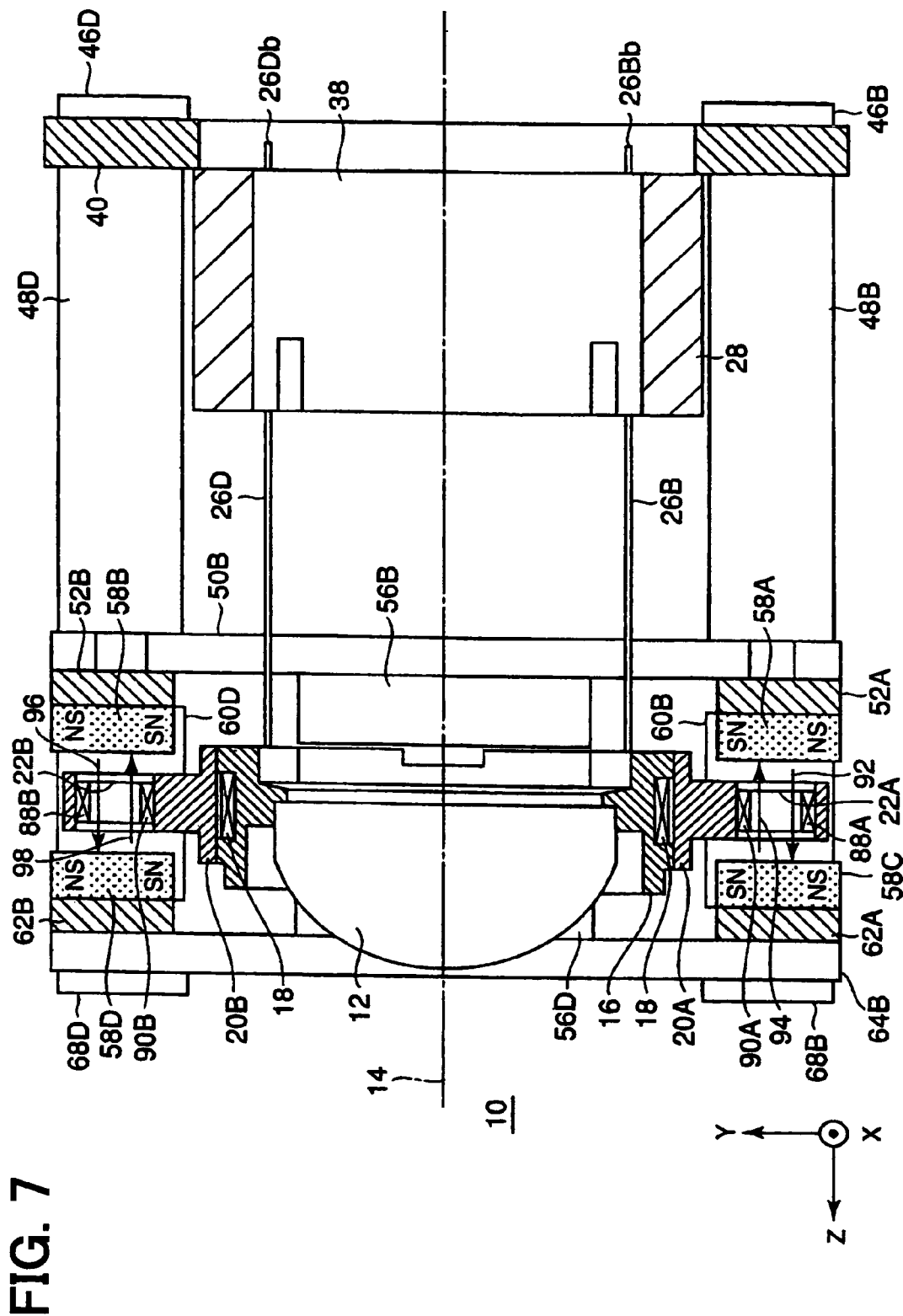
FIG. 7 is a plan cross sectional view of the lens drive apparatus taken along a Y-Z plane, along which the optical axis of the transmitter lens of the lens drive apparatus passes.
Figure 8:
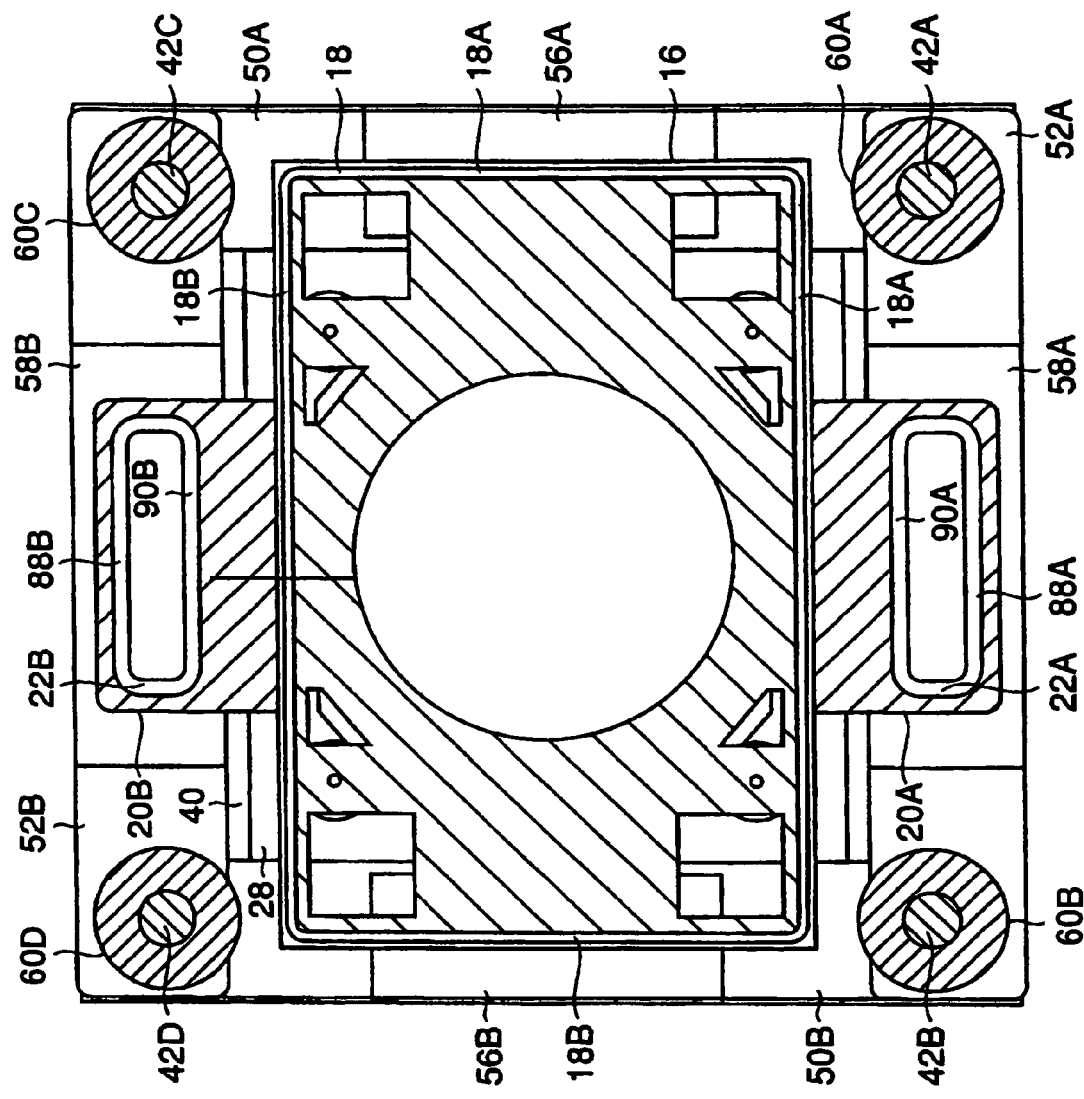
FIG. 8 is a cross sectional view taken along line VIII-VIII in FIG. 6.

FIGS. 1 to 8 show a lens drive apparatus 10 according to the embodiment of the present invention. FIGS. 1 and 2 are perspective views of the lens drive apparatus 10. FIG. 3 is a perspective view of the lens drive apparatus 10. FIGS. 4 and 5 are partial perspective views of the lens drive apparatus. FIG. 6 is a cross sectional view along a Z-X plane of FIG. 1, along which an optical axis 14 of a transmitter lens 12 extends. FIG. 7 is a cross sectional view along a Y-Z plane, along which the optical axis 14 of the transmitter lens 12 extends. FIG. 8 is a cross sectional view along line VIII-VIII in FIG. 6.

As shown in FIGS. 3 to 5, in the lens drive apparatus 10, the transmitter lens 12 is securely bonded to a holder (also referred to as a lens holder frame) 16, which is made of resin, such as polyphenylene sulfide resin containing glass. An X-coil 18 is wound around the holder 16 in an X-Y direction. The X-coil 18 is made from, for example, a copper-clad aluminum wire. Furthermore, coil assemblies 20A, 20B are respectively bonded to opposed ends of the holder 16, which are opposed to each other in the Y direction. Each coil assembly 20A, 20B is formed by insert molding a Y-coil 22A, 22B into a resin body. More specifically, each coil assembly 20A, 20B is molded from, resin, such as liquid crystal polymer resin containing glass, and the Y-coil 22A, 22B is made by winding, for example, a copper-clad aluminum wire.

Furthermore, as shown in FIG. 5, the holder 16 includes holes 24A-24D, in which one end of a corresponding one of wire springs (e.g., beryllium copper wire springs) 26A-26D is fixed. In this case, the wire spring 26A-26D is bonded in the hole 24A-24D, and the end of the wire spring 26A-26D, which is received through the hole 24A-24D, is soldered to a circuit board (not shown). The ends of the X-coil 18 and the ends of the Y-coils 22A, 22B are also soldered to this circuit board, and the wiring on the circuit board electrically connects the X-coil 18 and the Y-coils 22A, 22B to the wire springs 26A-26D.

The other ends of the wire springs 26A-26D are fixed to a spring support 28. The spring support 28 is made of, resin, such as liquid crystal polymer resin containing glass. The other ends, i.e., the fixing portions, of the wire springs 26A-26D will be described in detail with reference to FIG. 6. A portion B indicated in FIG. 6 is indicated as a cross sectional view to show a structure of the fixing portion of the wire spring 26B. Specifically, the spring support 28 includes hole segments 30B, 32B, 34B, and the wire spring 26B is received through the hole segments 30B, 32B, 34B. As clearly shown in FIG. 6, the inner diameters of the hole segments 30B, 32B are substantially larger than the outer diameter of the wire spring 26B. In contrast, the inner diameter of the hole segment 34B is only slightly larger than the outer diameter of the wire spring 26B, and thereby the portion of the wire spring 26B received in the hole segment 34B is securely bonded to the spring support 28, more specifically to the inner peripheral wall of the hole segment 34B of the spring support 28. Furthermore, silicone gel is filled in a gap 36B between an inner peripheral wall of the holes segment 32B and an outer peripheral wall of the wire spring 26B. The silicone gel filled in the gap 36B damps the vibration of the wire spring 26B. The hole segment 30B serves as a relief hole for avoiding interference with the movement of the wire spring 26B. The hole segment 32B is not extended to the position of the hole segment 30B in the positive Z direction (the left direction in FIG. 6) to avoid excessive damping of the vibration of the wire spring 26B by the silicone gel. The size of the spring support 28 is made relatively large in the Z direction to achieve the sufficient rigidity of the spring support 28. In the above description, although only the wire spring 26B is described, the other wire springs 26A, 26C, 26D are fixed in the manner similar to that of the wire spring 26B through the hole segments 30A, 30C, 30D and the like of the spring support 28.

With the above structure, the holder 16 is supported by the spring support 28 though the wire springs 26A-26D in such a manner that the holder 16 is movable in both of the X direction and the Y direction, i.e., in two dimensions. The spring support 28 further includes a through hole 38, through which light (a laser beam) described below is conducted toward the transmitter lens 12.

In the above structure, the other ends (the right ends in FIG. 6) 26Ab-26Db of the wire springs 26A-26D are fixed to the spring support 28 in such a manner that the other ends 26Ab-26Db of the wire springs 26A-26D protrude from the spring support 28 and are soldered to a flexible circuit board (not shown). The flexible circuit board is in turn connected to an electric circuit (not shown). With the above structure, the X-coil 18 and the Y-coils 22A, 22B are electrically connected to the electric circuit (not shown) through the wire springs 26A, 26D.

Furthermore, in the lens arrangement, which is assembled in the above described manner, the spring support 28 is fixed to a metal base frame 40 in such a manner that the through hole 38 of the spring support 28 is overlapped with a through hole 40a of the base frame 40 to allow transmission of the light therethrough. The base frame 40 alone or together with the spring support 28 serves as a base of the present invention.

As shown in FIGS. 1 to 3, stainless shafts 42A-42D are fixed to the base frame 40. Male threaded portions 42Aa-42Da, 42Ab-42Db are formed in opposed ends of the shafts 42A-42D. Female threaded portions 44A-44D are formed in corresponding portions of the base frame 40, which receive the shafts 42A-42D, respectively. The shafts 42A-42D are fixed to the base frame 40 when the male threaded portions 42Aa-42Da of the shafts 42A-42D are threadably engaged with the female threaded portions 44A-44D of the base frame 40. At this time, in order to limit loosening of the thread engagement between each male threaded portion 42Aa-42Da and the corresponding female threaded portion 44A-44D, a nut 46A-46D is threadably secured to the male threaded portion 42Aa-42Da of each shaft 42A-42D from the negative Z side (from the right side to left side in FIG. 2).

After the fixation of the shafts 42A-42D to the base frame 40, stainless collars 48A-48D are placed over the shafts 42A-42D. The inner diameter of each collar 48A-48D is only slightly larger than the outer diameter of the corresponding shaft 42A-42D, so that the collar 48A-48D is tightly fitted to the shaft 42A-42D.

Iron yokes 50A, 50B are installed to the positive Z side (the left side in FIG. 2) of the collars 48A-48D, and iron yokes 52A, 52B are installed to the positive Z side (the left side in FIG. 2) of the iron yokes 50A, 50B. The yokes 50A, 50B, 52A, 52B form a yoke arrangement of the present invention. The yokes 50A, 50B, 52A, 52B have installation holes (more specifically, installation recesses) 54A-54H, into which the shafts 42A-42D are received. Each installation hole 54A-54H opens at the lateral edge of the corresponding yoke 50A, 50B, 52A, 52B. With this structure, each shaft 42A-42D needs not to be installed into the corresponding installation hole 54A-54H in the Z-direction (the axial direction). Specifically, each shaft 42A-42D may be installed into the corresponding installation hole 54A-54H in the X-direction (the lateral direction). In this way, the assembling can be performed without causing interference with the holder 16.

Permanent magnets 56A, 56B are securely bonded to the yokes 50A, 50B, respectively, and permanent magnets 58A, 58B are securely bonded to the yokes 52A, 52B, respectively. The magnetic polarities of the magnets 56A, 56B, 58A, 58B will be described latter.

Iron collars 60A-60D are installed over the shafts 42A-42D, respectively, on the positive Z side (the left side in FIG. 2) of the yokes 52A, 52B. Similar to the collars 48A-48D, the inner diameter of each collar 60A-60D is only slightly larger than the outer diameter of the corresponding shaft 42A-42D, so that the collar 60A-60D is tightly fitted to the shaft 42A-42D. Unlike the stainless collars 48A-48D, the collar 60A-60D are made of the iron since the collars 60A-60D cooperate with the yokes 50A, 50B, 52A, 52B (and yokes 62A, 62B, 64A, 64B described below) and the magnets 56A, 56B (and permanent magnets 56C, 56D described below) as well as the magnets 58A, 58B (and permanent magnets 58C, 58D described below) to form a magnetic circuit.

The yokes 62A, 62B, which are made of iron, are installed to the positive Z side (the left side in FIG. 2) of the collars 60A-60D. Furthermore, the yokes 64A, 64B, which are made of iron, are installed to the positive Z side (the left side in FIG. 2) of the yokes 62A, 62B. The yokes 62A, 62B, 64A, 64B form a yoke arrangement of the present invention, which is axially spaced from the yoke arrangement formed by the yokes 50A, 50B, 58A, 58B. Unlike the installation holes 54A-54H of the yokes 50A, 50B, 52A, 52B, each of which opens at the lateral edge of the yoke 50A, 50B, 52A, 52B, installation holes 66A-66H of the yokes 62A, 62B, 64A, 64B, which receive the shafts 42A, 42D, are formed as normal through holes, each of which does not open at the lateral edge of the yoke 62A, 62B, 64A, 64B. Specifically, the shafts 42A-42D are installed through the installation holes 66A-66H of the yokes 62A, 62B, 64A, 64B in the Z-direction (the axial direction).

The magnets 58C, 58D are securely bonded to the yokes 62A, 62B, respectively. Furthermore, the magnets 56C, 56D are securely bonded to the yokes 64A, 64B, respectively. The magnetic polarities of the magnets 58C, 58D, 56C, 56D will be described latter.

The yokes 50A, 50B, 52A, 52B, 62A, 62B, 64A, 64B are fixed to the collars 48A-48D, 60A-60D by the bonding and the thread engagement of the nuts 68A-68D to the male threaded portions 42Ab-42Db of the shafts 42A-42D on the positive Z-side (the left side in FIG. 2) of the yokes 64A, 64B.

Next, the operation of the lens drive apparatus 10 of the present embodiment will be described.

Figure 9:
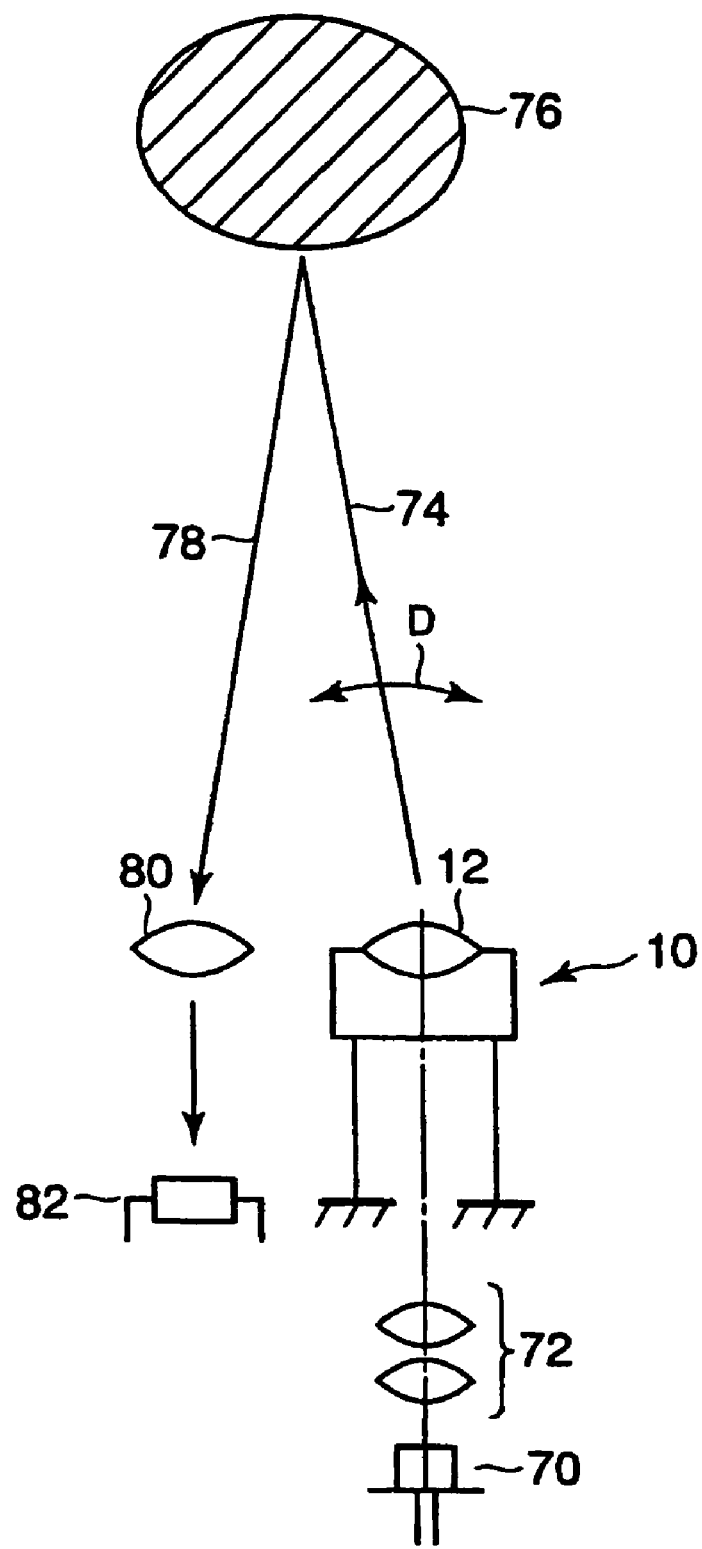
FIG. 9 is a schematic view showing a system that includes the lens drive apparatus according to the embodiment.

FIG. 9 schematically shows a system, in which the lens drive apparatus 10 of the present embodiment is used.

A laser beam is outputted from a laser beam source (a laser beam generator) 70 and is transmitted through a lens system 72. Thereafter, the laser beam is tilted or swung in the left-right direction as indicated by an arrow D by moving the transmitter lens 12 of the lens drive apparatus 10 in the left-right direction. The beam 74 impinges onto an obstacle 76 and is reflected by the obstacle 76. Then, the reflected beam 78, which is reflected by the obstacle 76, impinges onto a photodetector 82 through a receiver lens 80, and a distance to the obstacle 76 is computed by an electric circuit based on the output of the photodetector 82. The transmitter lens 12 is not only moved in the left-right direction but also in the up-down direction, so that the beam 74 can be also tilted or swung in the up-down direction.

The mechanism for moving the transmitter lens 12 in the up-down direction and the left-right direction will be described in detail.

As shown in FIGS. 6 and 8, a side 18A of the X-coil 18 is held between the magnet 56A and the magnet 56C, and a side 18B of the X-coil 18 is held between the magnet 56B and the magnet 56D. The magnetic polarities (the N-pole and the S-pole) of the magnets 56A-56D are indicated in FIG. 6, and a magnetic field is developed in a direction of an arrow 84, 86 at each of the sides 18A, 18B. A magnetic flux, which flows from the magnet 56C to the magnet 56A, returns to the magnet 56C through the following path: the yoke 50A; the yokes 52A, 52B; the collars 60A, 60C; the yokes 62A, 62B; and the yoke 64A. Furthermore, a magnetic flux, which flows from the magnet 56B to the magnet 56D, returns to the magnet 56B through the following path: the yoke 64B; the yoke 62A, 62B; the collars 60B, 60D, the yokes 52A, 52B; and the yoke 50B.

The direction of the electric current, which flows at the side 18A of the X-coil 18, is opposite from the direction of the electric current, which flows at the side 18B of the X-coil 18. Also, the direction 84 of the magnetic field is opposite from the direction 86 of the magnetic field. Thus, the direction of the thus generated force at the side 18A coincides with the direction of the thus generated force at the side 18B. Specifically, the direction of the force is the X-direction, which is perpendicular to the direction of the electric current and is also perpendicular to the direction of the magnetic field. In this way, by conducting the electric current in the X-coil 18, the holder 16 and the transmitter lens 12, which is installed to the holder 16, can be moved in the X-direction.

Furthermore, as shown in FIGS. 7 and 8, the Y-coil 22A is held between the magnet 58A and the magnet 58C, and the Y-coil 22B is held between the magnet 58B and the magnet 58D. The magnetic polarities of the magnets 58A-58D are indicated in FIG. 7. More specifically, the surface of each of the magnets 58A-58D are magnetized such that two opposite poles (the N-pole and the S-pole) are located on the surface of the magnet 58A-58D, which is axially opposed to the corresponding coil 22A, 22B. A direction of the magnetic field at a side 88A of the Y-coil 22A is indicated by an arrow 92. Furthermore, a direction of the magnetic field at a side 90A of the Y-coil 22A is opposite from the direction of the magnetic field at the side 88A and is indicated by an arrow 94. The direction of the electric current, which flows at the side 88A of the Y-coil 22A, is opposite from the direction of the electric current, which flows at the side 90A of the Y-coil 22A. Also, the direction 92 of the magnetic field is opposite from the direction 94 of the magnetic field. Thus, the direction of the thus generated force at the side 88A coincides with the direction of the thus generated force at the side 90A. Specifically, the direction of the force is the Y-direction, which is perpendicular to the direction of the electric current and is also perpendicular to the direction of the magnetic field.

Similarly, the magnetic field at a side 88B of the Y-coil 22B has a direction indicated by an arrow 96, and the magnetic field at a side 90B of the Y-coil 22B has a direction indicated by an arrow 98. The direction of the electric current, which flows at the side 88B of the Y-coil 22B, is opposite from the direction of the electric current, which flows at the side 90B of the Y-coil 22B. Also, the direction 96 of the magnetic field is opposite from the direction 98 of the magnetic field. Thus, the direction of the thus generated force at the side 88B coincides with the direction of the thus generated force at the side 90B. Specifically, the direction of the force is the Y-direction, which is perpendicular to the direction of the electric current and is also perpendicular to the direction of the magnetic field.

At the other sides (the vertical sides in FIG. 7) of the Y-coil 22A, 22B, which are other than the sides 88A, 88B, 90A, 90B, although the force is generated in the X-direction, the direction of the force generated due to the magnetic field in the direction of the arrow 92, 96 is opposite from the direction of the force generated due to the magnetic field in the direction of the arrow 94, 98. Thus, these forces are cancelled with each other and thereby will not be actually exerted in the X-direction.

The direction of the force generated by the Y-coil 22A in the Y-direction and the direction of the force generated by the Y-coil 22B in the Y-direction coincide with each other. Therefore, by conducting the electric current through the Y-coils 22A, 22B, the holder 16 and the transmitter lens 12 can be moved in the Y-direction.

As described above, according to the present embodiment, the yokes 50A, 50B, 52A, 52B, 62A, 62B, 64A, 64B are connected by the cylindrical shafts 42A-42D and the cylindrical collars 60A-60D to increase the rigidity. Thereby, the durability of the lens drive apparatus 10 is improved. Furthermore, the yokes 50A, 50B, 52A, 52B, 62A, 62B, 64A, 64B, the shafts 42A-42D and the collars 60A-60D do not interfere with the movable part (the holder 16 and the transmitter lens 12) at the time of the assembling of the lens drive apparatus 10, so that the assembling of the lens drive apparatus 10 is eased.

Furthermore, the vibration of the wire springs 26A-26D is effectively damped by filling the silicone gel at the spring support 28. Because of such measures taken against the external disturbance (the vibration), the lens drive apparatus 10 of the present embodiment can be effectively used in the system(s) installed in the vehicle or the like.

The embodiment of the present invention has been described. However, the present invention is not limited this particular embodiment, and the embodiment can be modified in various ways without departing from the scope of the present invention.

The magnets and the coils may be modified in various ways. For example, the X-coil 18 and the magnets 56A-56D may be modified in a manner similar to that of the Y-coils. Furthermore, each of the Y-coils 22A, 22B is held between the magnet 58A, 58B and the magnet 58C, 58D. Alternatively, one of the magnet 58A, 58B and the magnet 58C, 58D may be eliminated to leave only the single magnet 58A, 58B or 58C, 58D near the Y-coil 22A, 22B. Even in this modification, the presence of the two opposite poles, i.e., the N-pole and the S-pole on the surface of the single magnet 58A, 58B or 58C, 58D allows generation of the magnetic field, which flows from the N-pole of the surface to the S-pole of the surface, and this magnetic field can create the force similar to that of the above one. In this way, the number of the magnets can be advantageously reduced.

Each of the yokes 50A, 50B, 52A, 52B is formed as the straight yoke piece that extends along a single straight line. Alternatively, as shown in FIG. 10A, two L-shaped yokes (L-shaped yoke pieces) 100 may be used in combination. In such a case, portions of the yokes 100, which receive the shafts 42A-42C, may be formed as oblique recesses 102A-102C, each of which is recessed in an oblique direction between the X-direction and the Y-direction. In this way, the yokes 100 may be installed to the shafts 42A-42C by moving the yokes 100 in the X-Y plane.

Furthermore, as shown in FIG. 10B, two portions of the yoke 100, each of which is mounted with the corresponding magnet 56A, 58A, may be formed as a protrusion 104, which protrudes from the rest of the yoke 100, to adjust the position of the magnet 56A, 58A in the Z-direction.

In this way, the number of the yokes can be advantageously reduced.

This is also applicable to the yokes 62A, 62B, 64A, 64B. However, in the case of the yokes 62A, 62B, 64A, 64B, it is not required to slide the yokes 62A, 62B, 64A, 64B in the X-Y plane to install the same to the shafts 42A-42D. More specifically, these yokes 62A, 62B, 64A, 64B may be configured to be installed to the shafts 42A-42D in the Z-direction (the axial direction). For example, the yokes 62A, 62B, 64A, 64B may be configured as a square frame yoke 106, as shown in FIG. 11. In this way, the number of the yokes can be advantageously reduced, and the assembling of the lens drive apparatus 10 can be eased.

Furthermore, in the above embodiment, the shafts 42A-42D and the collars 48A-48D, 60A-60D are formed separately. Alternatively, as shown in FIG. 12A, a cylindrical member 108, which includes a male threaded portion 110 and a female threaded portion 112, may be used as the shaft. In this case, the cylindrical members 108, each of which has the length that corresponds to the corresponding collar 48A-48D and the corresponding collar 60A-60D, may be provided. Then, the male threaded portion 110 of the cylindrical member 108, which corresponds to the collar 48A-48D, is threadably engaged with the base frame 40, and the female threaded portion 112 of this cylindrical member 108 is threadably engaged with the male threaded portion 110 of the other cylindrical member 108, which corresponds to the collar 60A-60D. The female threaded portion 112 of the cylindrical member 108, which corresponds to the collar 60A-60D, may be threadably engaged with a bolt in place of the nut 68A-68D.

Furthermore, as shown in FIG. 12B, a positioning portion 114 may be provided in addition to the threaded portion to advantageously increase the positioning accuracy.

Through use of the cylindrical members 108 described above, the assembling work can be accelerated. Furthermore, the shape of the cylindrical members 108 may be modified in various ways.

Also, it should be noted that the cylindrical member 108, which corresponds to the collar 48A-48D, does not need be aligned with the cylindrical member 108, which corresponds to the collar 60A-60D, along the straight line.

Figure 13:
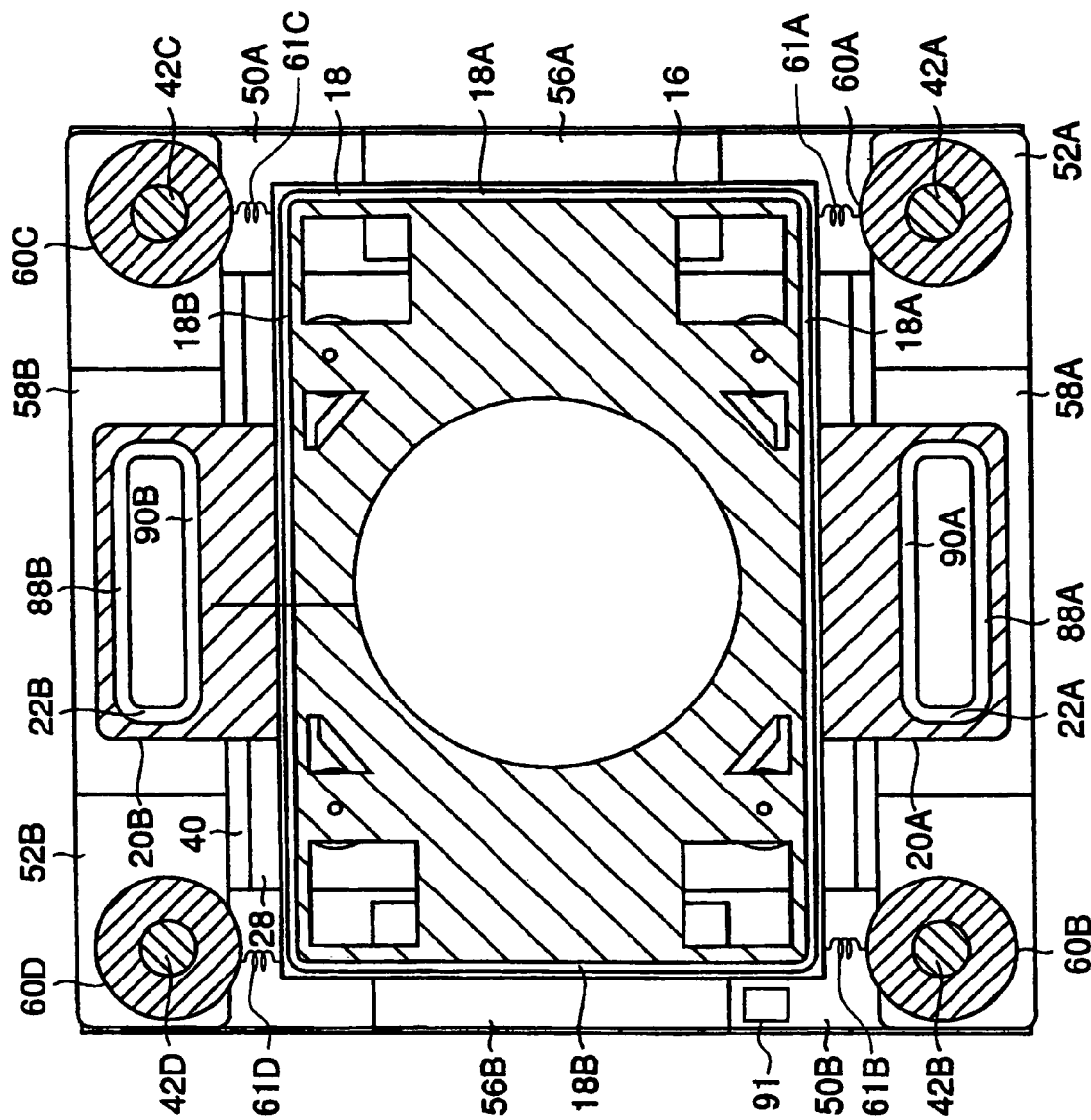
FIG. 13 is a cross sectional view similar to FIG. 8 indicating a modification of the lens drive apparatus.

The vibration of the wire springs 26A-26D is damped by the silicone gel filled at the spring support 28. Alternatively, a suitable damping mechanism may be provided between the holder 16 and the adjacent yokes or the adjacent collars to damp the vibration. For instance, as shown in FIG. 13, damper springs 61A-61D may be provided between the holder 16 and the collars 60A-60D.

Also, in some cases, a position sensor is required to obtain the position information of the transmitter lens 12. In such a case, the position sensor may be fixed to the corresponding yoke or shaft through a sensor fixing member. For instance, such a sensor 91 may be provided to the yoke 50B in FIG. 13.

Additional advantages and modifications will readily occur to those skilled in the art. The invention in its broader terms is therefore not limited to the specific details, representative apparatus, and illustrative examples shown and described.

What is claimed is:

1. A lens drive apparatus comprising:
    a base that has a through hole, which penetrates through the base;
    a plurality of shafts that are fixed to the base and extend in a direction generally parallel to a center axis of the through hole of the base;
    two yoke arrangements, each of which holds a plurality of permanent magnets and surrounds the center axis of the through hole of the base, wherein the two yoke arrangements are supported by the plurality of shafts and are axially spaced from each other;
    a lens holder frame that holds a lens, which has an optical axis generally parallel to the central axis of the through hole of the base, wherein the lens holder frame is axially placed in a space between the two yoke arrangements and is swingably supported by a plurality of wire springs, which are fixed to the base; and
    a plurality of drive coils that are fixed to the lens holder frame and generate a drive force to move the lens holder frame.

2. The lens drive apparatus according to claim 1, further comprising at least one damper, which is positioned between the lens holder frame and at least one of the plurality of shafts.

3. The lens drive apparatus according to claim 1, further comprising a position sensor, which is installed to one of the two yoke arrangements to senses a position of the lens holder frame.

4. The lens drive apparatus according to claim 1, wherein each of the yoke arrangements includes one of:
    a plurality of straight yoke pieces, which are connected together; and a
    plurality of L-shaped yoke pieces, which are connected together.

5. The lens drive apparatus according to claim 1, further comprising a laser beam source, which provides a laser beam through the through hole of the base toward the lens, wherein the plurality of drive coils drive the lens holder frame in two dimensions to move the lens.

6. The lens drive apparatus according to claim 1, wherein at least one of the plurality of permanent magnets is opposed to a corresponding one of the plurality of drive coils and has an S-pole and an N-pole, which are provided in an axial end surface of the permanent magnet that axially opposes the corresponding drive coil.

7. The lens drive apparatus according to claim 1, further comprising silicone gel, which is held between at least one of the plurality of flexible wire springs and the base.

8. The lens drive apparatus according to claim 1, wherein at least one of the two yoke arrangements is formed as a square frame yoke.

9. The lens drive apparatus according to claim 1, wherein the plurality of wire springs extend generally parallel to the optical axis.

* * * * *